United States Patent
Lee

(10) Patent No.: US 10,115,435 B2
(45) Date of Patent: Oct. 30, 2018

(54) METHODS AND SYSTEMS FOR PRIORITIZING PLAYBACK OF MEDIA CONTENT IN A PLAYBACK QUEUE

(71) Applicant: SPOTIFY AB, Stockholm (SE)

(72) Inventor: Brian Lee, Stockholm (SE)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 15/372,306

(22) Filed: Dec. 7, 2016

(65) Prior Publication Data

US 2017/0169858 A1 Jun. 15, 2017

Related U.S. Application Data

(60) Provisional application No. 62/267,090, filed on Dec. 14, 2015.

(51) Int. Cl.

| | | |
|---|---|---|
| *G11B 27/34* | (2006.01) | |
| *H04N 21/482* | (2011.01) | |
| *G06F 3/16* | (2006.01) | |
| *H04N 21/262* | (2011.01) | |
| *G06F 17/30* | (2006.01) | |

(52) U.S. Cl.
CPC ............ *G11B 27/34* (2013.01); *G06F 3/165* (2013.01); *H04N 21/4825* (2013.01); *G06F 17/30053* (2013.01); *H04N 21/26258* (2013.01)

(58) Field of Classification Search
None
See application file for complete search history.

(56) References Cited

U.S. PATENT DOCUMENTS

| | | | | |
|---|---|---|---|---|
| 2011/0246621 A1* | 10/2011 | May, Jr. | ............ | H04N 7/17318 709/219 |
| 2013/0159858 A1* | 6/2013 | Joffray | ............... | H04N 21/4788 715/719 |
| 2014/0075308 A1* | 3/2014 | Sanders | ............ | G06F 17/30772 715/716 |
| 2015/0355879 A1* | 12/2015 | Beckhardt | ............... | H04L 65/60 700/94 |
| 2016/0080470 A1* | 3/2016 | Shanson | ............ | H04L 65/4084 709/219 |

* cited by examiner

*Primary Examiner* — Jeffrey A Gaffin
*Assistant Examiner* — John M Heffington
(74) *Attorney, Agent, or Firm* — Morgan, Lewis & Bockius LLP

(57) ABSTRACT

Methods and systems for prioritizing playback of media content in a playback queue are described herein. In one aspect, a client device plays a first media item from a playback queue. The playback queue includes a first portion having a plurality of media items with respective positions that define an order in which the media items are to be played. While playing the first media item, a first user input indicating selection of a second media item is detected. In response to the first user input, the second media item is assigned to a second portion of the playback queue, wherein the second portion has playback priority over the first portion. After playing the first media item, the second media item is played before playing other media items of the plurality of media items in the first portion.

13 Claims, 15 Drawing Sheets

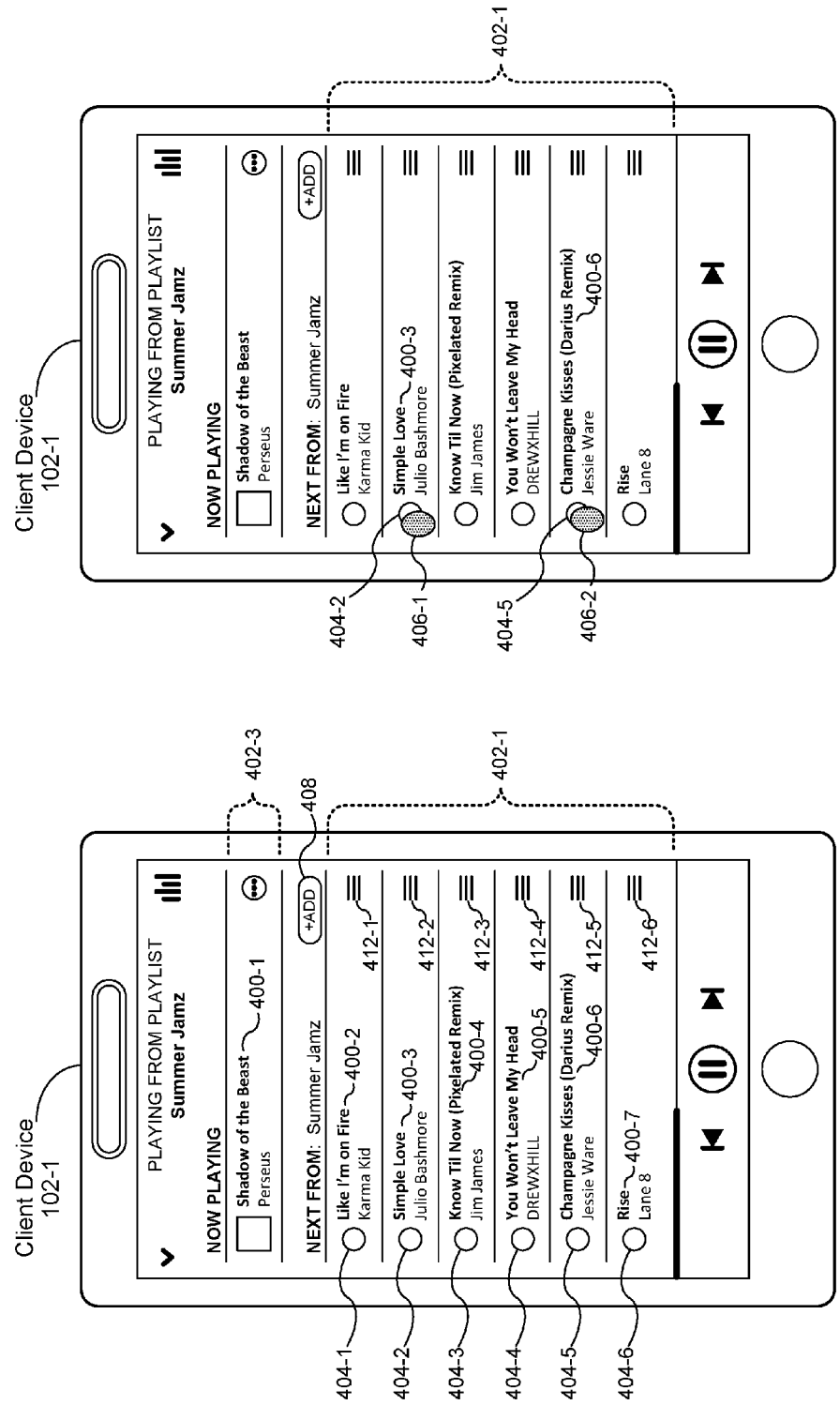

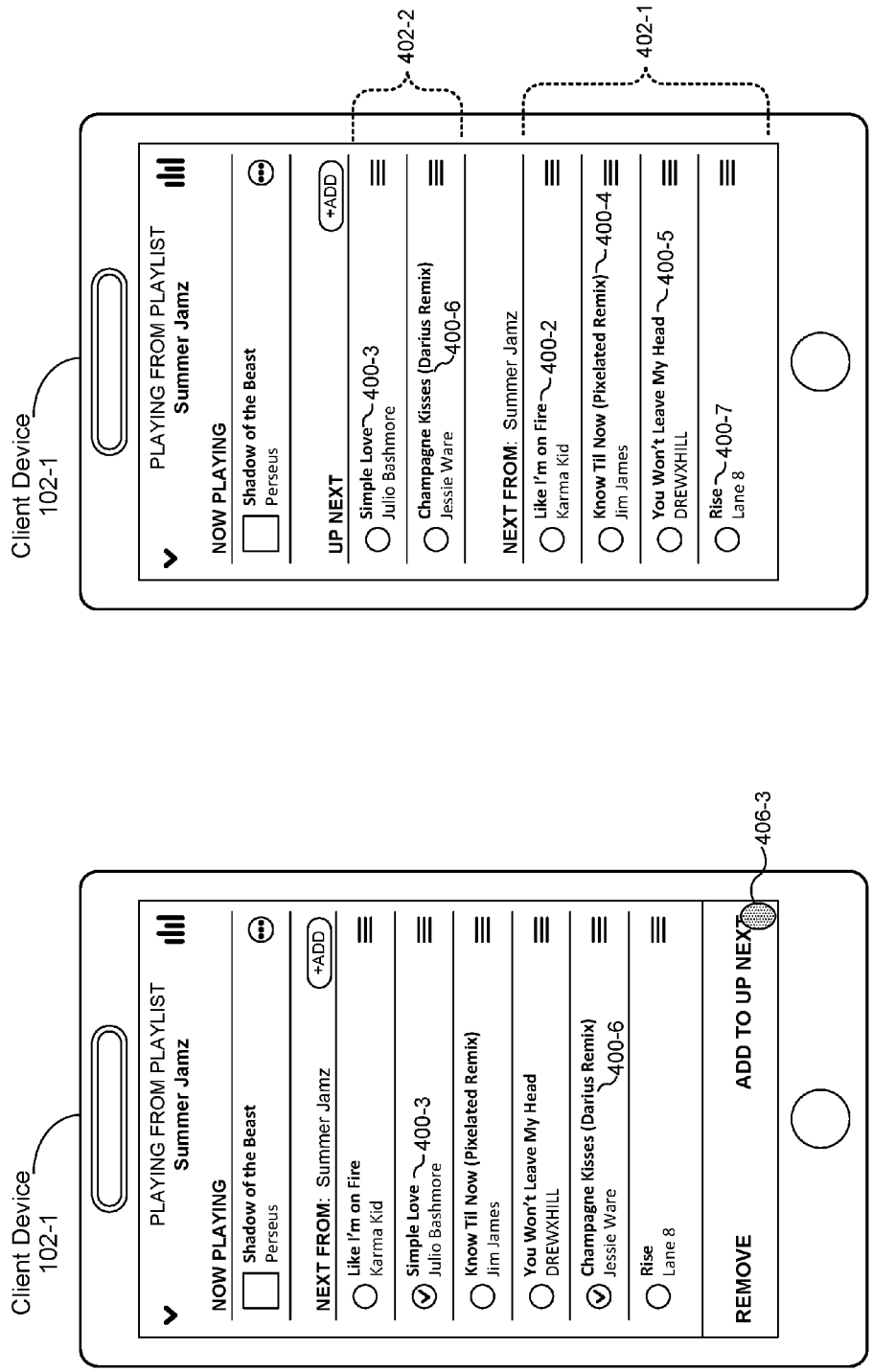

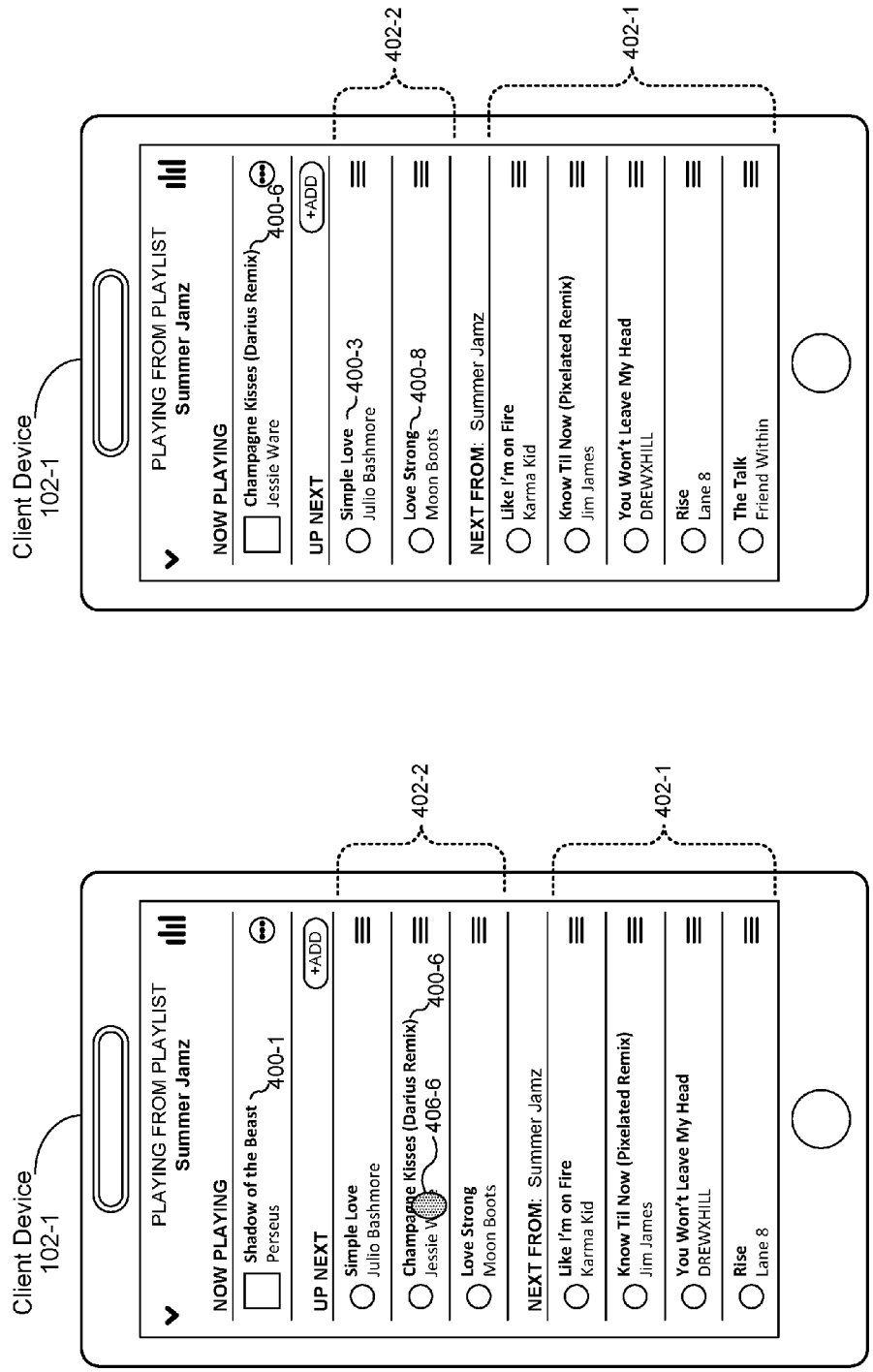

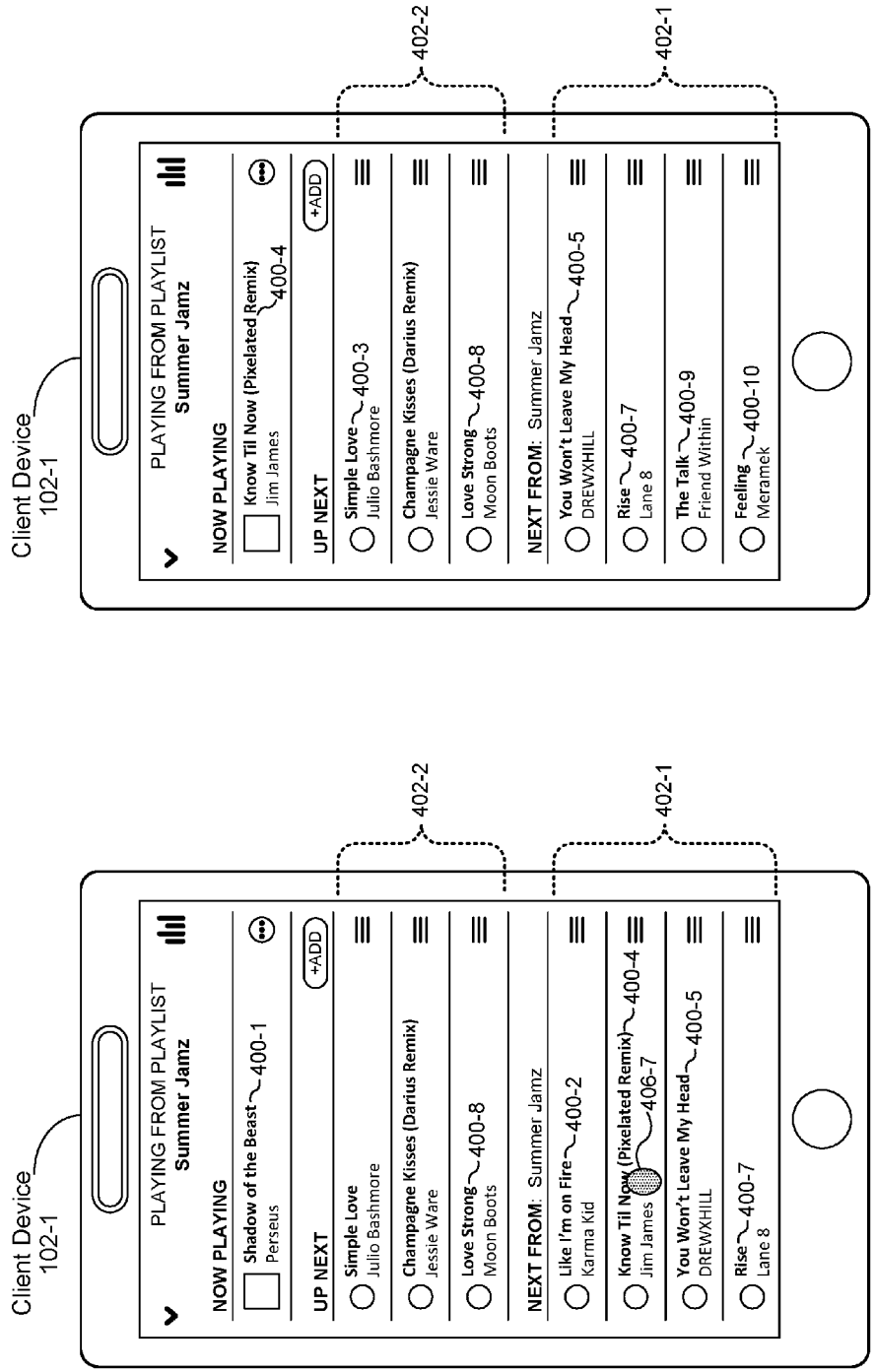

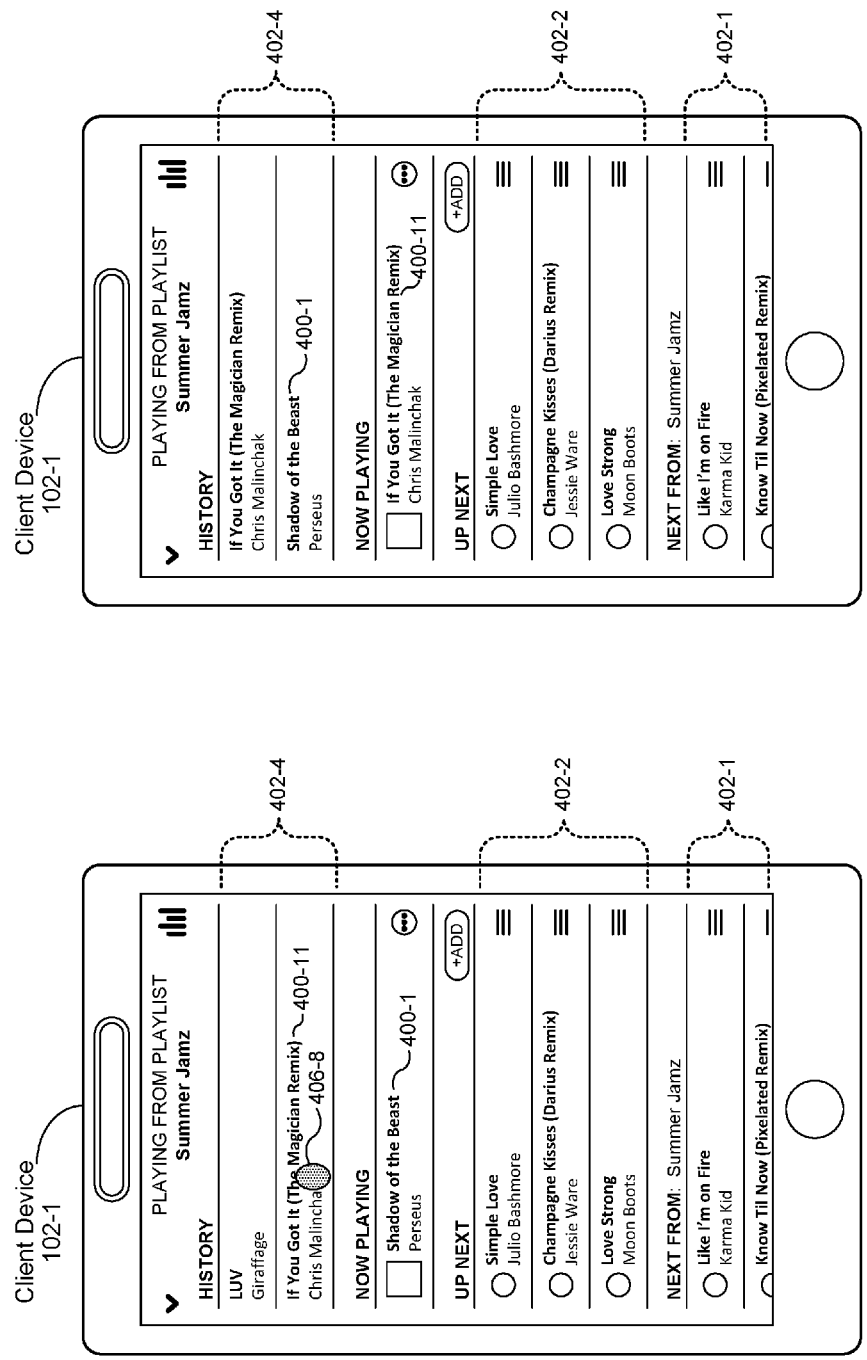

METHODS AND SYSTEMS FOR PRIORITIZING PLAYBACK OF MEDIA CONTENT IN A PLAYBACK QUEUE

RELATED APPLICATION

This application claims priority and benefit to U.S. Provisional Application No. 62/267,090, filed Dec. 14, 2015, entitled "Methods and Systems for Prioritizing Playback of Media Content in a Playback Queue," which is hereby incorporated by reference in its entirety.

TECHNICAL FIELD

The disclosed implementations relate generally to media playback, and, in particular, to prioritizing playback of media content in a playback queue.

BACKGROUND

Playlists are commonly used to organize and define an order in which media content is played. While playing media from a predefined playlist, users sometimes wish to interrupt playback by selecting items to be played from other sources, such as a list of media content search results, or by selecting content to be played from the current playlist out of turn. Such actions that disrupt the playback order of the active playlist, however, often make it difficult for users to resume playback of the previous playlist. For example, users take note of a last position in the playlist prior to interrupting playback and manually resume from that position.

SUMMARY

Accordingly, there is a need for systems and methods for prioritizing playback of media content in a playback queue. By assigning media items to a portion of a playback queue that has playback priority over a different portion of the playback queue, such as a predefined playlist, users are able to select certain media items to be played before other media items of the playback queue. Users are therefore able to more efficiently and effectively manage prioritization of media content in a playback queue. Such systems and methods optionally complement or replace conventional methods for managing playback of media content.

In accordance with some implementations, a method is performed at a client device (e.g., a mobile phone or tablet computer) having one or more processors and memory storing instructions for execution by the one or more processors. The method includes playing a first media item from a playback queue, the playback queue including a first portion having a plurality of media items with respective positions that define an order in which the media items are to be played. While playing the first media item, a first user input indicating selection of a second media item is detected. In response to the first user input, the second media item is assigned to a second portion of the playback queue. The second portion has playback priority over the first portion. After playing the first media item, the second media item is played before playing other media items of the plurality of media items in the first portion.

In accordance with some implementations, a client device includes one or more processors and memory storing one or more programs configured to be executed by the one or more processors. The one or more programs include instructions for performing the operations of the method described above. In accordance with some implementations, a non-transitory computer-readable storage medium has stored therein instructions that, when executed by the client device, cause the client device to perform the operations of the method described above.

Thus, devices are provided with efficient, user-friendly methods for prioritizing playback of media content in a playback queue.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

Reference will now be made to implementations, examples of which are illustrated in the accompanying drawings. In the following description, numerous specific details are set forth in order to provide an understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are used only to distinguish one element from another. For example, a first device could be termed a second device, and, similarly, a second device could be termed a first device, without departing from the scope of the various described implementations. The first device and the second device are both devices, but they are not the same device.

The terminology used in the description of the various implementations described herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
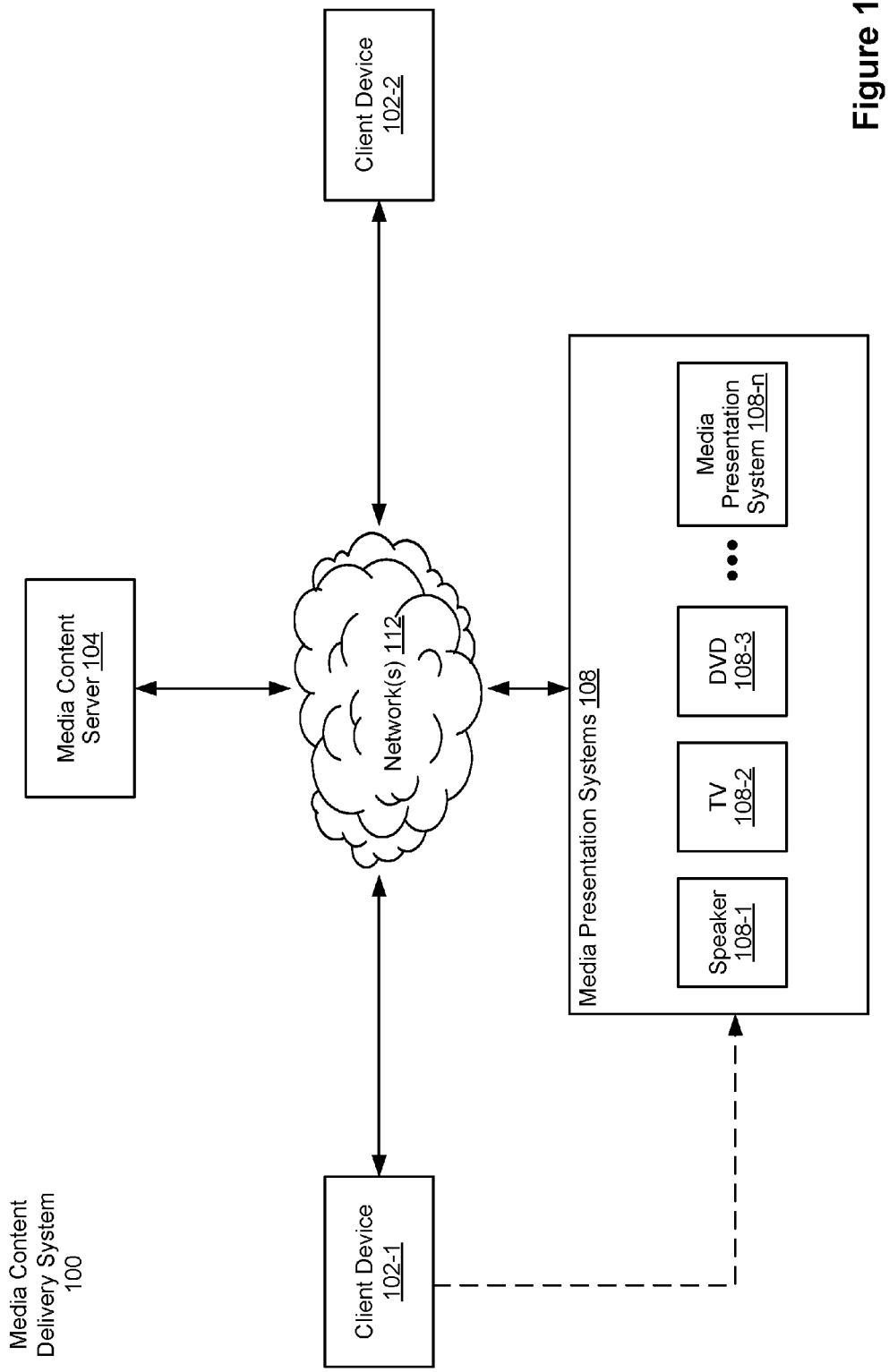
FIG. 1 is a block diagram illustrating an exemplary media content delivery system in accordance with some implementations.

FIG. 1 is a block diagram illustrating an exemplary media content delivery system 100 in accordance with some implementations. The media content delivery system 100 includes one or more client devices 102 (e.g., client device 102-1 and client device 102-2), one or more media content servers 104, and one or more media presentation systems 108, including speaker 108-1, television (TV) 108-2, digital versatile disk (DVD) 108-3, and/or other media presentation system 108-n (where n is an integer greater than three). One or more networks 112 communicably couple each component of the media content delivery system 100 with other components of the media content delivery system 100. In some implementations, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some implementations, a client device 102-1 or 102-2 is associated with one or more users. In some implementations, a client device is a personal computer, a mobile electronic device, a wearable computing device, a laptop, a tablet computer, a mobile phone, a feature phone, a smart phone, a digital media player, or any other electronic device capable of presenting media content (e.g., controlling playback of media items, such as music tracks, videos, etc.). In some implementations, client devices 102-1 and 102-2 are the same type of device (e.g., client device 102-1 and client device 102-2 are both mobile devices). Alternatively, client device 102-1 and client device 102-2 are different types of devices.

In some implementations, client devices 102-1 and 102-2 send and receive media-control information through the networks 112. For example, client devices 102-1 and 102-2 send media control requests (e.g., requests to play music, movies, playlists, or other media content items) to media content server 104 through network(s) 112. Additionally, client devices 102-1 and 102-2, in some implementations, also receive authentication tokens from the media content server 104 through network(s) 112. For example, client device 102-1 initially sends media control requests for a particular media presentation system 108, and client device 102-2 subsequently may also send media control requests for the media presentation system 108 after receiving an authentication token corresponding to the media presentation system 108.

In some implementations, client device 102-1 communicates directly with media presentation systems 108. As pictured in FIG. 1, client device 102-1 is able to communicate directly (e.g., through a wired connection or through a short-range wireless signal, such as those associated with BLUETOOTH/BLE communication technologies, radio-frequency-based near-field communication technologies, infrared communication technologies, etc.) with media presentation systems 108, while client device 102-2 communicates with the media presentation systems 108 through network(s) 112. In some implementations, client device 102-1 uses the direct connection with media presentation systems 108 to stream content (e.g., data for media items) for playback on the media presentation systems 108.

In some implementations, client device 102-1 and client device 102-2 each include a media application 222 (FIG. 2) that allows a user of the client device to browse, request (e.g., for playback at the client device 102 and/or a media presentation system 108), and/or present media content (e.g., control playback of music tracks, videos, etc.). Media content may be stored locally (e.g., in memory 212 of the client device 102, FIG. 2) and/or received in a data stream (e.g., from the media content server 104). The media presentation system 108 is part of the client device 102, such as built-in speakers or a screen, or separate from the client device 102, such as a wirelessly coupled speaker (e.g., speaker 108-1).

In some implementations, the media content server 104 stores and provides media content (also referred to as media items) (e.g., media content requested by the media application 222 of client device 102-1 and/or 102-2) to client devices 102 and/or media presentation systems 108 via the network(s) 112. Content stored and served by the media content server 104, in some implementations, includes any appropriate content, including audio (e.g., music, spoken word, podcasts, etc.), videos (e.g., short-form videos, music videos, television shows, movies, clips, previews, etc.), text (e.g., articles, blog posts, emails, etc.), images (e.g., photographs, drawings, renderings, etc.), games (e.g., 2- or 3-dimensional graphics-based computer games, etc.), or any combination of content types (e.g., web pages that include any combination of the foregoing types of content or other content not explicitly listed). The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to other servers and/or server systems, or other devices, such as other client devices, databases, content delivery networks (e.g., peer-to-peer networks), network caches, and the like. In some implementations, the media content server 104 is implemented by multiple computing devices working together to perform the actions of a server system (e.g., cloud computing).

As described above, media presentation systems 108 (e.g., speaker 108-1, TV 108-2, DVD 108-3, media presentation system 108-n) are capable of receiving media content (e.g., from the media content server 104) and presenting the received media content. For example, speaker 108-1 is a component of a network-connected audio/video system (e.g., a home entertainment system, a radio/alarm clock with a digital display, or an infotainment system of a vehicle). In some implementations, the media content server 104 sends media content to the media presentation systems 108. For example, media presentation systems 108 include computers, dedicated media players, network-connected stereo and/or speaker systems, network-connected vehicle media systems, network-connected televisions, network-connected DVD players, and universal serial bus (USB) devices used to provide a playback device with network connectivity, and the like.

Figure 2:
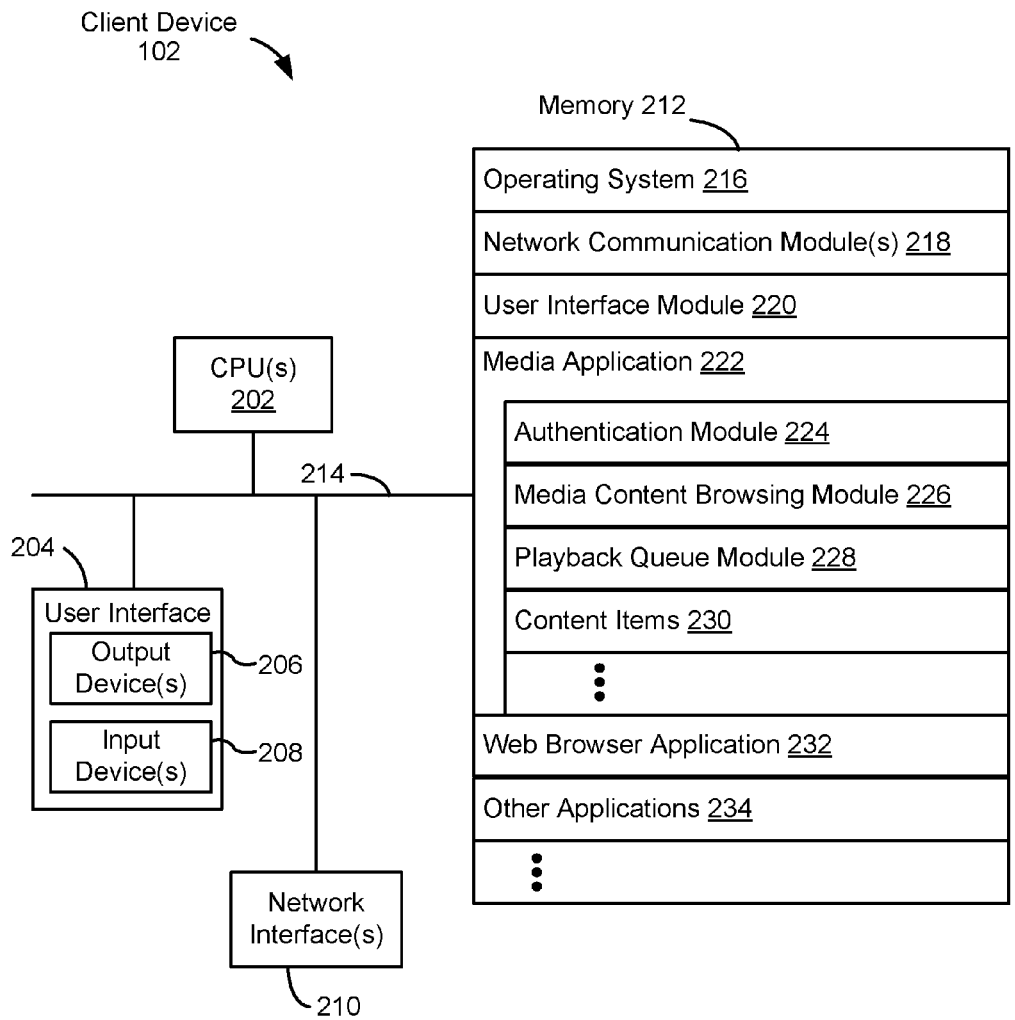
FIG. 2 is a block diagram illustrating an exemplary client device in accordance with some implementations.

FIG. 2 is a block diagram illustrating an exemplary client device 102 (e.g., client device 102-1 and/or client device 102-2, FIG. 1) in accordance with some implementations. The client device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

As also shown in FIG. 2, the client device 102 includes a user interface 204, including output device(s) 206 and input device(s) 208. In some implementations, the input devices include a keyboard, mouse, or track pad. Alternatively, or in addition, in some implementations, the user interface 204 includes a display device that includes a touch-sensitive surface, in which case the display device is a touch-sensitive display. In client devices that have a touch-sensitive display, a physical keyboard is optional (e.g., a soft keyboard may be displayed when keyboard entry is needed). The output devices (e.g., output device(s) 206) also optionally include speakers or an audio output connection connected to speakers, earphones, or headphones. Furthermore, some client devices 102 use a microphone and voice recognition device to supplement or replace the keyboard. Optionally, the client device 102 includes an audio input device (e.g., a microphone) to capture audio (e.g., speech from a user). Optionally, the client device 102 includes a location-detection device, such as a GPS (global positioning satellite) or other geo-location receiver, and/or location-detection software for determining the location of the client device 102.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some implementations, memory 212 or the non-transitory computer-readable storage medium of memory 212 stores the following programs, modules, and data structures, or a subset or superset thereof:

- an operating system 216 that includes procedures for handling various basic system services and for performing hardware dependent tasks;
- network communication module(s) 218 for connecting the client device 102 to other computing devices (e.g., media presentation systems 108, media content server 104, and/or other client devices) via the one or more network interface(s) 210 (wired or wireless) connected to one or more network(s) 112 such as the Internet, other WANs, LANs, PANs, MANs, VPNs, peer-to-peer networks, content delivery networks, ad-hoc connections, and so on;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application associated with a media content provider, including a media player, a streaming media application, or any other appropriate application or component of an application) for browsing, receiving, processing, presenting, and requesting playback of media content (e.g., media items, media content streams, media content files, advertisements, web pages, videos, audio, games, etc.). The media application 222 also includes the following modules (or sets of instructions), or a subset or superset thereof:
    - an authentication module 224 for sending authentication tokens corresponding to one or more media presentation systems associated with the client device 102 (e.g., one or more of the media presentation systems 108 from FIG. 1), receiving authentication tokens from other client devices, and/or generating authentication tokens for media presentation systems associated with client device 102;
    - a media content browsing module 226 for providing controls and/or user interfaces enabling a user to navigate, select for playback, and otherwise control or interact with media content (e.g., playing media items based on their positions within a playback queue), whether the media content is stored or played locally or remotely;
    - a playback queue module 228 for enabling a user to manage media items in a playback queue and portions thereof (e.g., adding or reassigning media items to a portion of a playback queue having playback priority, changing a playback order of media items within the playback queue, etc.); and
    - a content items module 230 storing media items for playback;
- a web browser application 232 (e.g., Internet Explorer by Microsoft, Firefox by Mozilla, Safari by Apple, or Chrome by Google) for accessing, viewing, and interacting with web sites; and
- other applications 234, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

In some implementations, the media presentation system 108 is a type of client device 102, and includes some or all of the same components, modules, and sub-modules as described above in FIG. 2 with respect to the client device 102.

Figure 3:
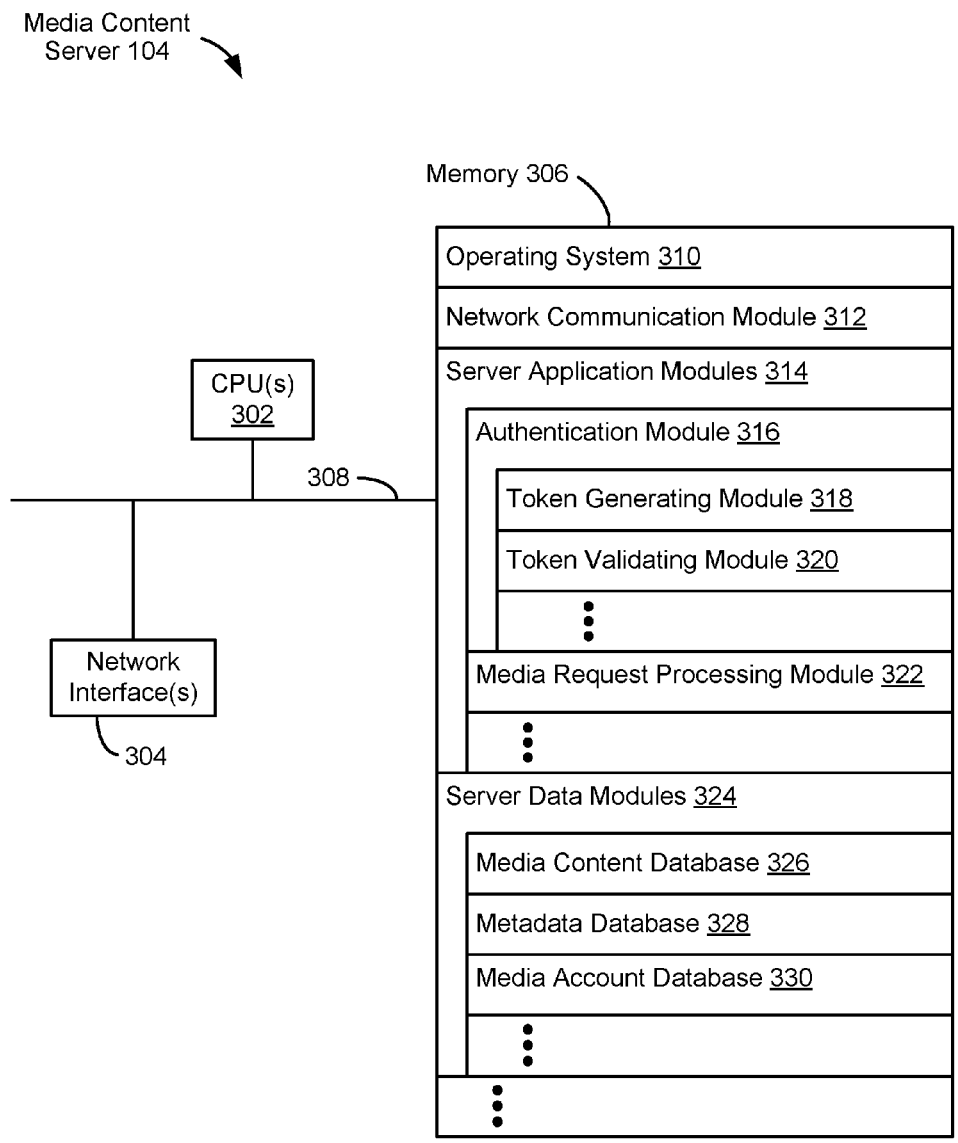
FIG. 3 is a block diagram illustrating an exemplary media content server in accordance with some implementations.

FIG. 3 is a block diagram illustrating an exemplary media content server 104 in accordance with some implementations. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306, optionally, includes one or more storage devices remotely located from one or more CPUs 302. Memory 306, or, alternatively, the non-volatile solid-state memory device(s) within memory 306, includes a non-transitory computer-readable storage medium. In some implementations, memory 306, or the non-transitory computer-readable storage medium of memory 306, stores the following programs, modules and data structures, or a subset or superset thereof:

- an operating system 310 that includes procedures for handling various basic system services and for performing hardware dependent tasks;
- a network communication module 312 that is used for connecting the media content server 104 to other computing devices via one or more network interfaces 304 (wired or wireless) connected to one or more networks 112 such as the Internet, other WANs, LANs, PANs, MANs, VPNs, peer-to-peer networks, content delivery networks, ad-hoc connections, and so on;
- one or more server application modules 314 for enabling the media content server 104 to perform various functions, the server application modules 314 including, but not limited to, one or more of:
  - an authentication module 316 for managing authentication and/or authorization requests, the authentication module 316 including, but not limited to, one or more of:
    - a token generating module 318 for generating authentication tokens permitting use of media presentation systems 108; and
    - a token validating module 320 for verifying that an authentication token is valid (e.g., has not yet expired or has not yet been revoked); and
  - a media request processing module 322 for processing requests for media content and facilitating access to requested media content items by client devices (e.g., the client device 102) including, optionally, streaming media content to such devices and/or to one or more media presentation systems 108; and
- one or more server data module(s) 324 for handling the storage of and access to media content items and metadata relating to the media content items; in some implementations, the one or more server data module(s) 324 include:
  - a media content database 326 for storing media content items (e.g., audio files, video files, text files, etc.);
  - a metadata database 328 for storing metadata relating to the media content items; and
  - a media account database 330 for storing account information for user media accounts, including user profiles, credentials (e.g., user identifiers, passwords, email addresses, etc.), credentials or identifiers of any linked accounts, and the like.

In some implementations, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various implementations. In some implementations, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some implementations, FIG. 3 is intended more as a functional description of the various features that may be present in one or more media content servers than as a structural schematic of the implementations described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the media content server 104, and how features are allocated among them, will vary from one implementation to another and, optionally, depends in part on the amount of data traffic that the server system handles during peak usage periods as well as during average usage periods.

In some implementations, the media content server 104 uses tables, databases, or other appropriate data structures (e.g., authentication module 316 and/or server data modules 324) to associate respective users with respective media presentation systems and to manage authentication tokens (i.e., access tokens) associated with respective media presentation systems.

Figure 4F:
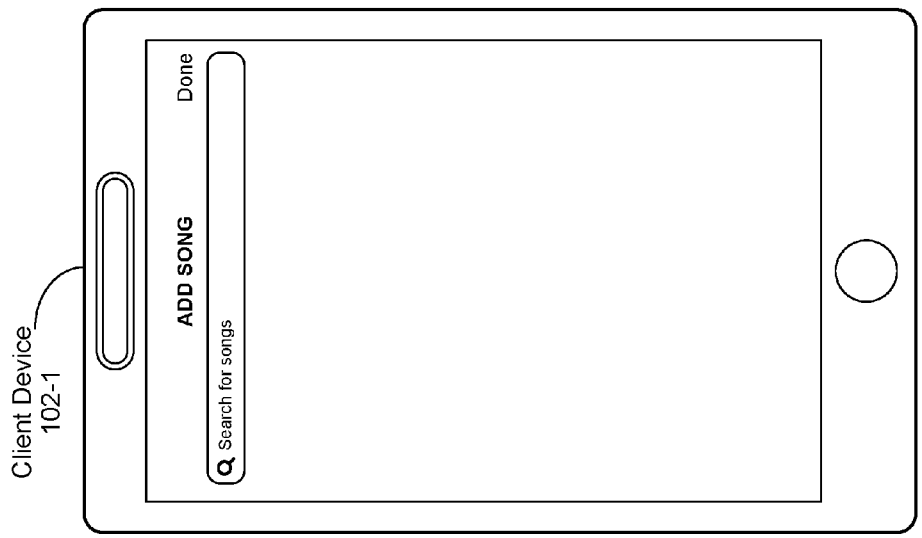
FIGS. 4A-4Q illustrate exemplary graphical user interfaces for prioritizing playback of media content in a playback queue in accordance with some implementations.
Figure 4E:
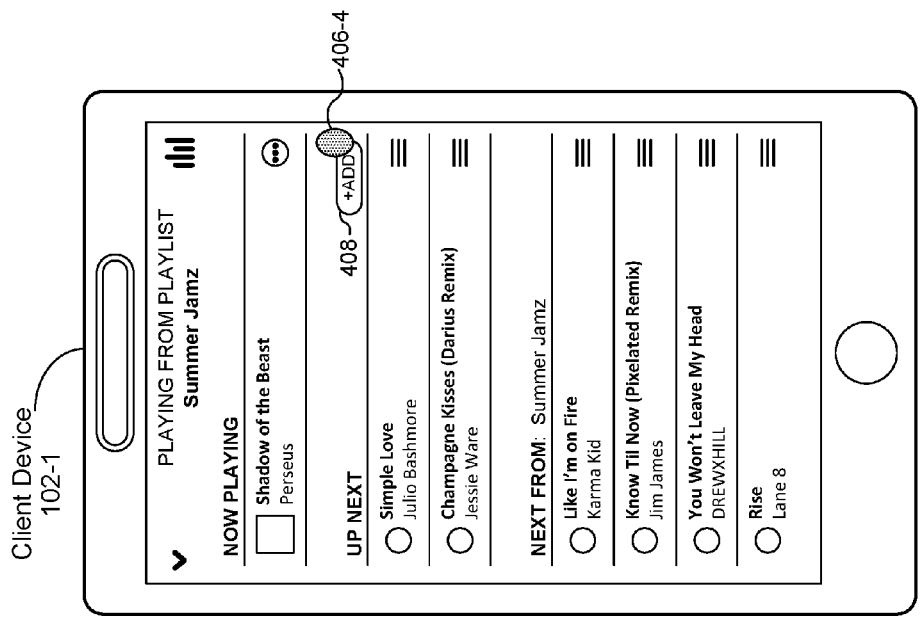
Figure 4G:
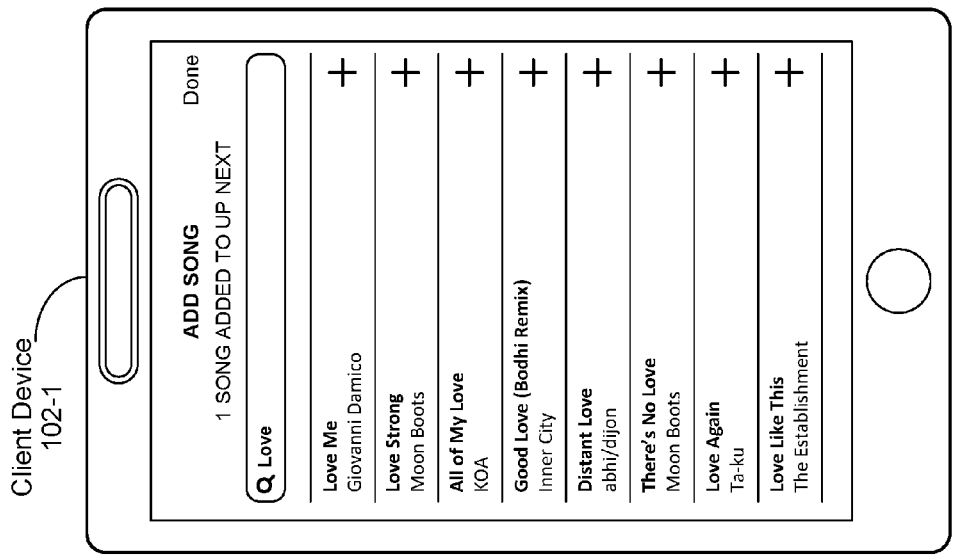
Figure 4H:
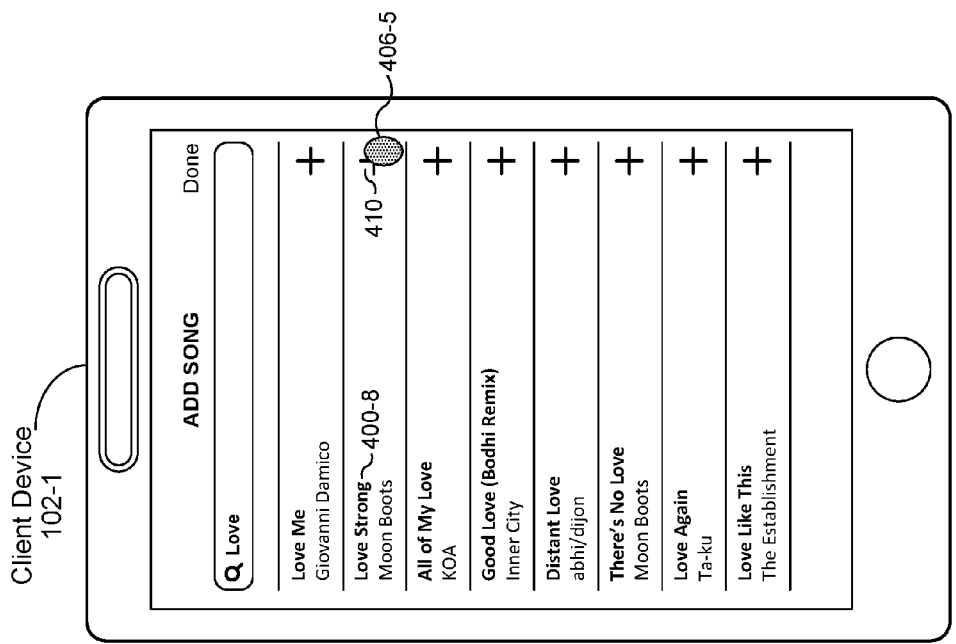
Figure 4I:
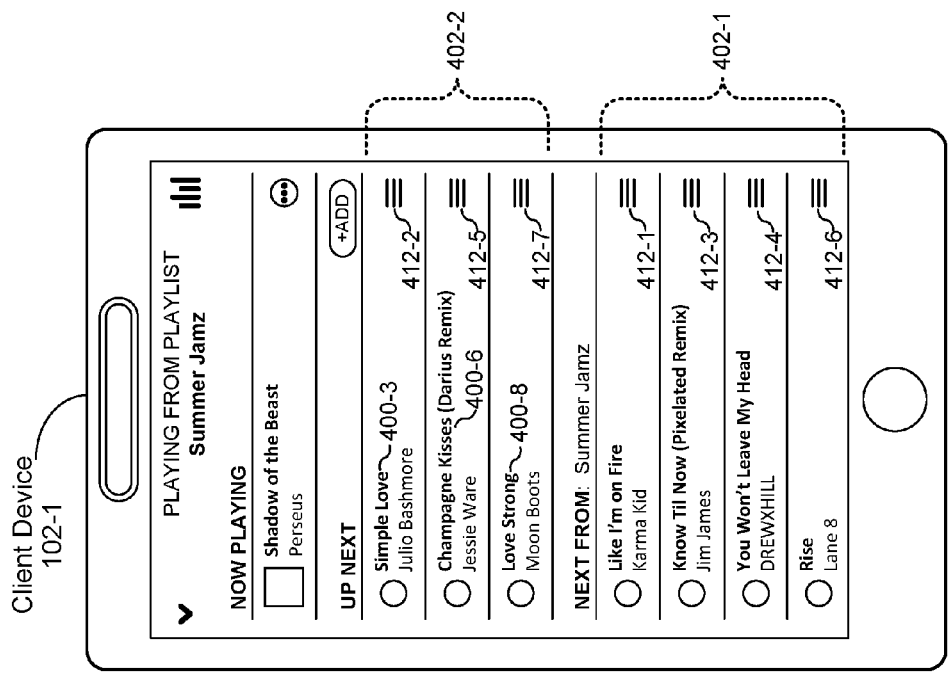
Figure 4Q:
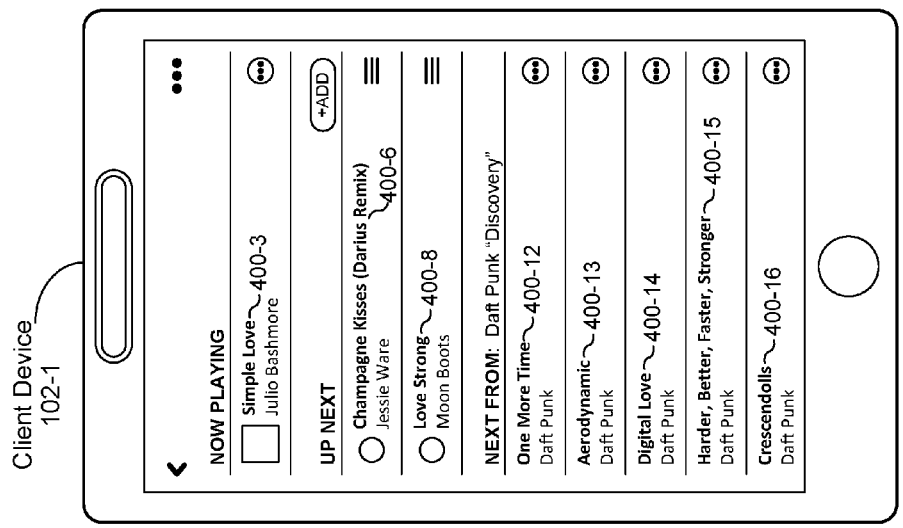
Figure 5A:
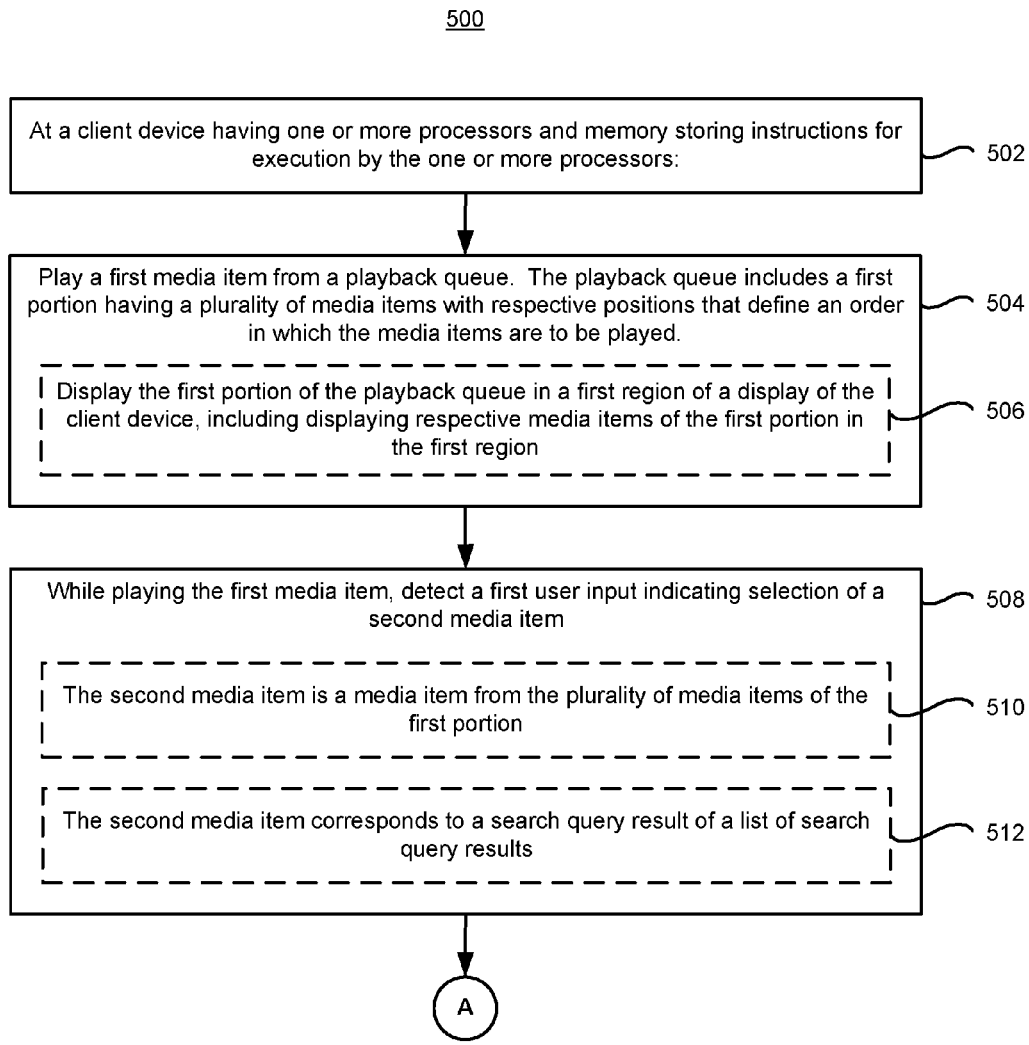
FIGS. 5A-5C are flow diagrams illustrating a method for prioritizing playback of media content in a playback queue in accordance with some implementations.
Figure 5B:
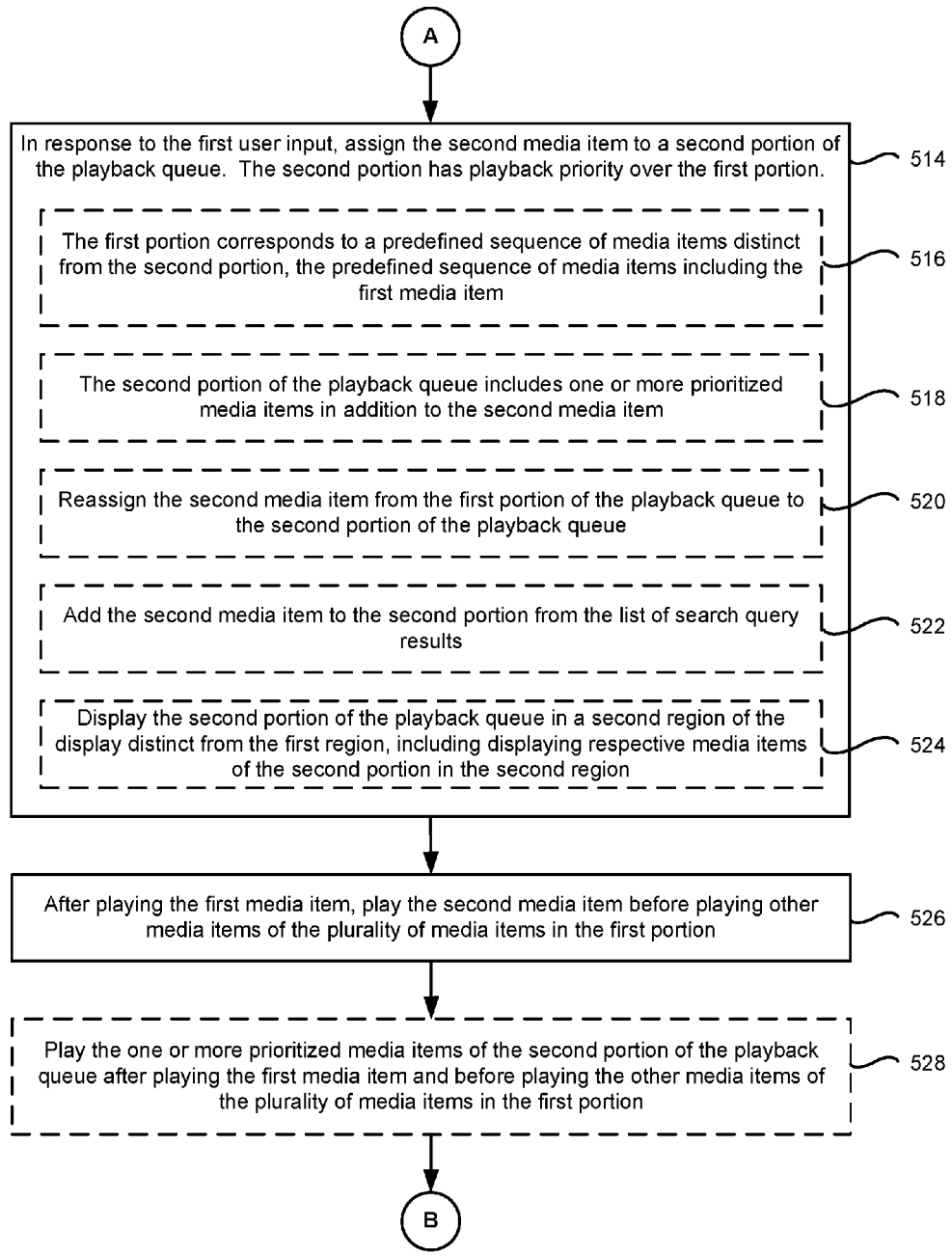
Figure 5C:
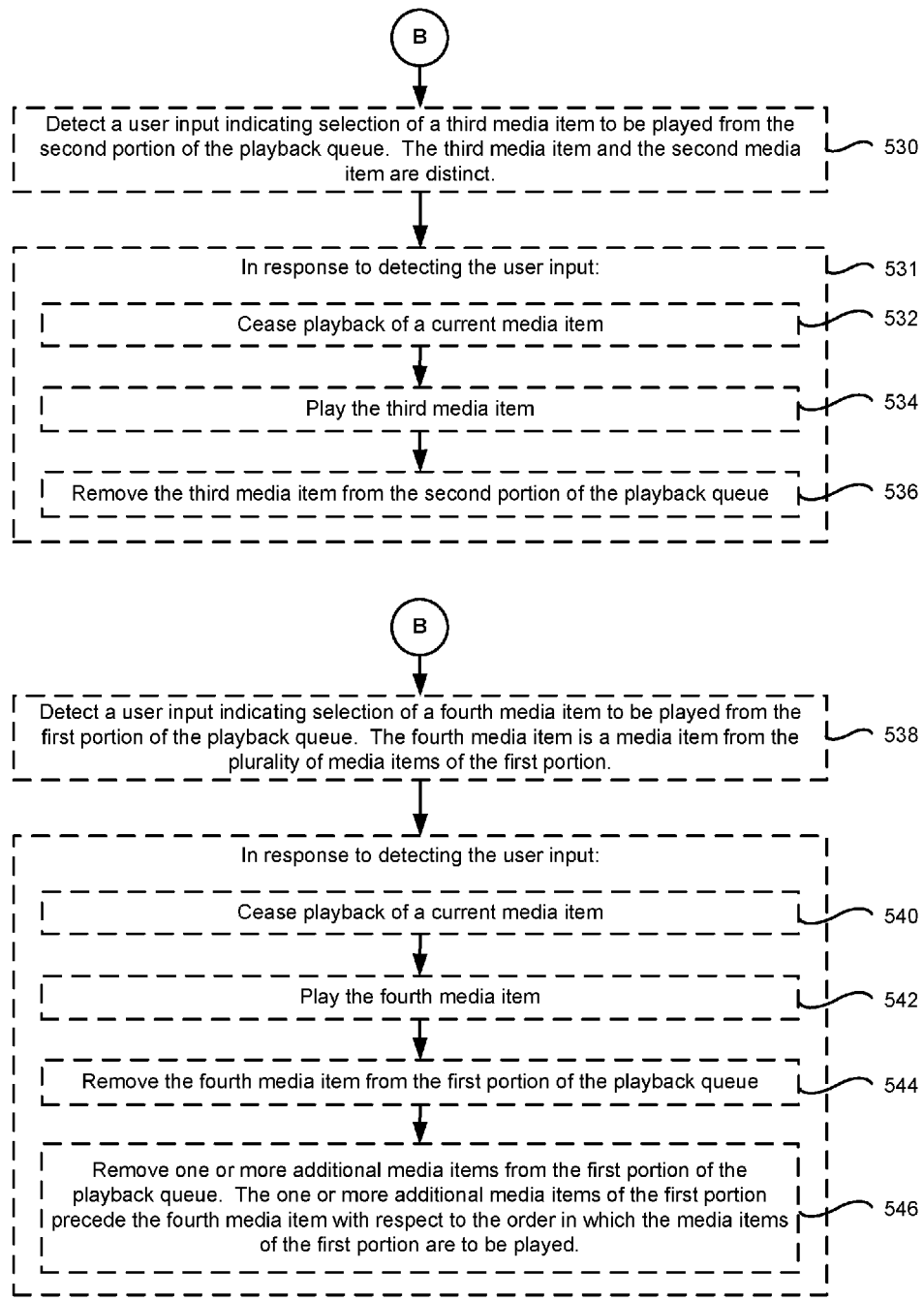

FIGS. 4A-4Q illustrate exemplary graphical user interfaces (GUIs) on a client device 102-1 for prioritizing playback of media content in a playback queue, in accordance with some implementations. The GUIs in these figures are used to illustrate the processes described below, including the method 500 (FIGS. 5A-5C). While FIGS. 4A-4Q illustrate examples of GUIs, in other implementations, one or more GUIs display user-interface elements in arrangements distinct from the implementations of FIGS. 4A-4Q. The GUIs shown in FIGS. 4A-4Q may be provided by a media application (e.g., media application 222, FIG. 2), a web browser (e.g., web browser application 232), and/or a third-party application (e.g., other application 234, FIG. 2).

The GUI in FIG. 4A illustrates a currently playing media item 400-1 and multiple media items (e.g., media items 400-2 through 400-7) in a playback queue. Respective positions of media items in a playback queue define an order in which media items are played. For example, media items 400-2 through 400-7 are played sequentially in descending order after playing media item 400-1 (e.g., playing media item 400-2, then 400-3, then 400-4 . . . ).

In some implementations, a playback queue includes multiple distinct portions, where each portion (referred to herein as a "queue portion") includes one or more distinct media items. One example is shown in FIG. 4D, where a first queue portion shown in region 402-1 (e.g., corresponding to some media items of predefined playlist, "Summer Jamz") and second queue portion shown in region 402-2 (e.g., corresponding to prioritized media items of a queue portion having playback priority, as described below) together compose a playback queue of a media application of the client device 102-1 (e.g., media application 222, FIG. 2).

Positions of media items within a respective queue portion define an order in which media items in that queue portion are played (e.g., in FIG. 4D, for the first queue portion shown in region 402-1, media item 400-2 precedes media item 400-4 in terms of playback order). Additionally, queue portions may also have different playback priorities with respect to each other. That is, media items associated with one queue portion having playback priority over a different queue portion (referred to as prioritized media items) are played before other media items of the playback queue (e.g., media items of a queue portion without playback priority). As an example, referring again to FIG. 4D, media items 400-3 and 400-6 of the second queue portion (shown in region 402-2) are to be played before playing any of the media items of the first queue portion (shown in region 402-1). Various ways in which media items may be added or reassigned to a queue portion having playback priority are illustrated in and described with respect to FIGS. 4A-4I. Furthermore, the effects of playback behavior on the playback queue are illustrated in and described with respect to FIGS. 4J-4O.

As shown in FIGS. 4A-4D, in some implementations, media items may be reassigned from a first queue portion (e.g., a predefined playlist) to a second queue portion having playback priority over the first. Referring to the example in FIG. 4A, media items 400-2 through 400-7 displayed in region 402-1 correspond to a first portion of a playback queue (i.e., a first queue portion). In this example, the first queue portion is a predefined playlist, titled "Summer Jamz." Selection affordances 404-1 through 404-6 are displayed next to corresponding media items 400-2 through 400-7. As shown in FIG. 4B, user inputs 406-1 and 406-2 are detected on selection affordances 404-2 and 404-5 of media items 400-3 and 400-6. FIG. 4C illustrates the selection of media items 400-3 and 400-6 in response to detecting the user inputs 406-1 and 406-2, as shown by the visually distinguished selection affordances. Here, after selecting media items 400-3 and 400-6, a user input 406-3 is detected on an affordance ("ADD TO UP NEXT") for assigning media items to a prioritized queue portion. In response to the user input 406-3, media items 400-3 and 400-6 are removed from the first queue portion (i.e., playlist "Summer Jamz") and assigned to a second queue portion having playback priority over the first queue portion. As shown in the GUI in FIG. 4D, a new region 402-2 (labeled "Up Next") is displayed, which includes media items 400-3 and 400-6 of the second queue portion. Furthermore, after removing media items 400-3 and 400-6 from the first queue portion (and ceasing display of media items 400-3 and 400-6 in region 402-1), the playback order of media items within region 402-1 is rearranged such that media item 400-4 is now to be played immediately after media item 400-2 (i.e., without playing media item 400-3 in between), and media item 400-7 is to be played immediately after media item 400-5 (i.e., without playing media item 400-6 in between). Consequently, rather than playing media items 400-3 and 400-6 in an order determined by their previous positions within the first queue portion (order shown by region 402-1 in FIG. 4A), media items 400-3 and 400-6 of the second queue portion (corresponding to region 402-2) are taken out of turn and played before media items 400-2, 400-4, 400-5, and 400-7 of the first queue portion (corresponding to region 402-1).

Additionally and/or alternatively, as shown in FIGS. 4E-4I, media items may be added to a queue portion from a list of search query results. Referring to FIG. 4E, a user input 406-4 is detected on a search affordance 408, and in response, a GUI (FIG. 4F) including a search query text input is displayed. Referring to FIG. 4G, a user enters a text-based search query ("Love") and a list of search results including the search query text is displayed. A user input 406-5 is detected on an affordance 410, indicating a user selection to add the corresponding search-result media item 400-8 to the second queue portion (corresponding to region 402-2, FIG. 4D), which has playback priority. The GUI in FIG. 4H displays a confirmation that the media item 400-8 was added to the second queue portion ("1 SONG ADDED TO UP NEXT"). As shown in FIG. 4I (which appears after selecting the "Done" affordance in FIG. 4H), region 402-2 corresponding to the second queue portion having playback priority includes the media item 400-8, the position of which corresponds to the end of the second queue portion (i.e., media item 400-8 is to be played after playing media item 400-6).

Additionally and/or alternatively, the positions (and thus the playback order) of media items within respective queue portions of a playback queue may be changed. The GUI in FIG. 4A, for example, shows affordances 412-1 through 412-6 for corresponding media items 400-2 through 400-7 of a first queue portion (playlist "Summer Jamz"). A user may select an affordance of a corresponding media item to rearrange the corresponding media item with respect to other media items of the queue portion (e.g., using a click-and-drag gesture). In some implementations, these affordances may be used in a similar manner to reassign media items from one queue portion to another (e.g., from a queue portion having playback priority to another queue portion not having playback priority, or vice versa). An example GUI is shown in FIG. 4I, where media items in both the first queue portion and second queue portion having corresponding affordances 412-1 through 412-7.

In some cases, a user may select a media item for playback, rather than wait for a particular media item to be played in the order defined by its position in the overall playback queue. As shown in FIGS. 4J-4O, depending on what portion of the playback queue (or other location within or sources of the corresponding media application) the media item is selected from, media items of the playback queue, and respective queue portions of the playback queue, are adjusted accordingly.

Referring to FIGS. 4J and 4K, in some implementations, media items are selected for playback from a portion of the playback queue that has playback priority. For example, as shown in FIG. 4J, a user input 406-6 is detected on media item 400-6 in the second queue portion (displayed in region 402-2). In response (FIG. 4K), media item 400-6 commences playback and is removed from the second queue portion, as shown by the client device 102-1 ceasing display of the media item 400-6 in region 402-2. For example, media item 400-1 stops playback and is removed from region 402-3, and media item 400-6 is displayed in region 402-3 to indicate that it is now being played. Accordingly, after selection for playback of the media item 400-6, the order of playback is adjusted such that media item 400-3 is to be played next, after which media item 400-8 is to be played.

Referring to FIGS. 4L and 4M, in some implementations, media items are selected for playback from a portion of the playback queue that has does not have playback priority (e.g., a predefined playlist). For example, as shown in FIG. 4L, a user input 406-7 is detected on media item 400-4 in the first queue portion (displayed in region 402-1, corresponding to playlist "Summer Jamz"). In response (FIG. 4M), media item 400-4 commences playback and is removed from the first queue portion, as shown by the client device 102-1 ceasing display of the media item 400-4 in region 402-1 and displaying it in region 402-3. In some implementations, media items in the first queue portion that precede the media item selected for playback are also removed in response to the selection. In the example shown in FIG. 4M, media item 400-2, which precedes media item 400-4 in the first queue portion, is also removed from the first queue portion in response to user input 406-7, as shown by the client device 102-1 ceasing display of the media item 400-2 in addition to removing media item 400-4. Playback of media item 400-2 is thus skipped. In other implementations (not shown), media items that precede the media item selected for playback are not removed and thus maintain their position within the respective queue portion. FIG. 4M also illustrates two other media items 400-9 and 400-10 of the first queue portion (previously off-screen, and which follow media item 400-7 with respect to playback order) being displayed within region 402-1 after media item 400-4 is selected for playback. As a result of selecting media item 400-4 out of turn, the order of playback is adjusted such that media item 400-5 is to be played after playing media item 400-8 from the second queue portion (instead of media items 400-2 and 400-4 previously). Media item 400-3 is now scheduled to be played after media item 400-4.

Referring to FIGS. 4N and 4O, in some implementations, media items are selected for playback from other locations or sources within a media application (e.g., media application 222). An example is illustrated in FIG. 4N, where media item 400-11 is selected from a list of previously played media items maintained by the media application, corresponding to region 402-4 (labeled "History"). In response to detecting the user input 406-8, media item 400-11 commences playback (i.e., is played again), and media item 400-1 (which was previously playing prior to detecting the user input 406-8) ceases playback and is shown in the list of previously played media items shown in region 402-4. The playback order after playing media item 400-11, defined by media items of the first queue portion (corresponding to region 402-1) and media items of the second queue portion having playback priority (corresponding to region 402-2), is unaffected by playing the media item 400-11.

Figure 4P:
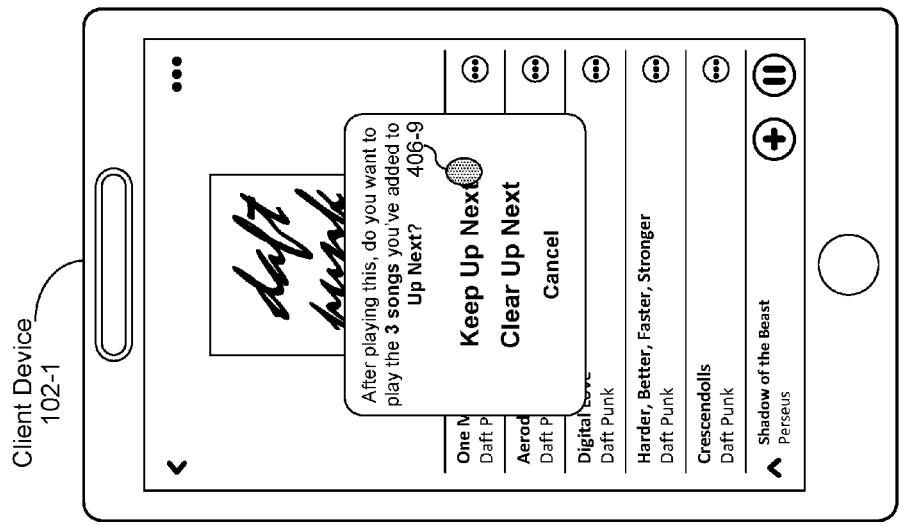

In some cases, a user may switch contexts within a media application. For example, a user may switch from playback of media items from one playlist (e.g., a predefined user playlist) to playback of media items from a different location or source within the media application (e.g., an artist album or another predefined playlist). FIG. 4P illustrates an example in which a user transitions from the playback queue in FIG. 4I (which includes the first queue portion corresponding to region 402-1 and the second queue portion corresponding to region 402-2) to media items of an artist album shown in FIG. 4P. In response to the context-switch request, the user is queried as to whether to maintain the second queue portion having playback priority (media items 400-3, 400-6, and 400-8, FIG. 4I). A user input 406-9 is detected, corresponding to an affirmative selection to maintain the second queue portion having playback priority. In response, as shown in FIG. 4Q, the second queue portion is maintained upon switching contexts, such that media items 400-3, 400-6, and 400-8 (corresponding to the second queue portion having playback priority, shown in region 402-2 of FIG. 4I) are to be played before playing media items from the album playlist (e.g., "Discovery" album, by "Daft Punk"). If a user input corresponding to a negative selection (e.g., selection of "Clear Up Next") is detected, however, then the second queue portion is not maintained and playback starts from the beginning of the playlist.

FIGS. 5A-5C are flow diagrams illustrating a method 500 for prioritizing playback of media content in a playback queue, in accordance with some implementations. The method 500 is performed (502) at a client device (e.g., client device 102, FIGS. 1 and 2) (or a media presentation system 108, FIG. 1, and/or other electronic device) having one or more processors and memory storing instructions for execution by the one or more processors. FIGS. 5A-5C correspond to instructions stored in a computer memory (e.g., memory 212 of the client device 102, FIG. 2) or other computer-readable storage medium. To assist with describing the method 500, FIGS. 5A-5C will be described with reference to the exemplary GUIs illustrated in FIGS. 4A-4Q.

In performing the method 500, the client device plays (504) a first media item from a playback queue. The playback queue includes a first portion having a plurality of media items with respective positions that define an order in which the media items are to be played. An example is shown in FIG. 4A, where the client device 102-1 plays media item 400-1 from a first portion of a playback queue, the first portion including media items 400-2 through 400-7 from playlist "Summer Jamz." In this example, the order of playback corresponds to the respective positions of the media items 400-2 through 7, shown in descending order in FIG. 4A (e.g., media item 400-2 is to be played before media item 400-3, which is to be played before media item 400-4, etc.).

In some implementations, the first portion of the playback queue is displayed (506) in a first region of a display of the client device, including displaying respective media items of the first portion in the first region. Referring to the example in FIG. 4A, media items of the first portion (e.g., playlist "Summer Jamz") of the playback queue are displayed in region 402-1. In some implementations, a currently playing media item (e.g., the first media item) is displayed in a respective region of the display distinct from the first region (e.g., media item 400-1 displayed in region 402-3, FIG. 4A).

While playing the first media item, a first user input indicating selection of a second media item is detected (508). In some implementations, the second media item is (510) a media item from the plurality of media items of the first portion. For example, in FIG. 4B, user input 406-1 is detected on selection affordance 404-2, indicating selection of media item 400-3. In some implementations, the second media item corresponds (512) to a search query result of a list of search query results. For example, in FIG. 4G, a list of search results is displayed in response to a user query for available media items. Here, user input 406-5 is detected on affordance 410, indicating selection of media item 400-8.

Referring now to FIG. 5B, in response to the first user input, the second media item is assigned (514) to a second portion of the playback queue. The second portion has playback priority over the first portion. In some implementations, the first portion (e.g., a user playlist in playback) and the second portion (e.g., one or more media items having playback priority) together compose the playback queue. (Alternatively, the playback queue includes one or more additional portions.) An example is shown in FIGS. 4B-4D, where media items 400-3 and 400-6 are selected (in response to user inputs 406-1 and 406-2, FIGS. 4B and 4C), and in response, media items 400-3 and 400-6 are added to a second portion of the playback queue (corresponding to region 402-2 in FIG. 4D). Another example is shown in FIGS. 4G-4I. As a result of the second portion having playback priority over the first portion, when playing media items in accordance with the playback queue, media items of the second portion (e.g., media items 400-3 and 400-6, FIG. 4D) are to be played (i.e., are scheduled) before media items of the first portion (e.g., media items 400-2, 400-4, 400-5, and 400-7 of playlist "Summer Jamz," FIG. 4D).

In some implementations, the first portion corresponds (516) to a predefined sequence of media items distinct from the second portion, the predefined sequence of media items including the first media item. For example, referring to FIG. 4D, a second portion of the playback queue having playback priority includes media items 400-3 and 400-6, which is distinct from the first portion corresponding to the playlist "Summer Jamz," which included currently playing media item 400-1 and now includes media items 400-2, 400-4, 400-5, and 400-7 (and possibly other media items off-screen that are not shown).

In some implementations, the second portion of the playback queue includes (518) one or more prioritized media items in addition to the second media item (e.g., in addition to media item 400-3, the second portion of the playback queue includes media item 400-6, FIG. 4D, and media item 400-8, FIG. 4I). As described below, prioritized media items (e.g., media items of the second portion of the playback queue) are to be played before non-prioritized media items (e.g., media items of the first portion of the playback queue).

In some implementations, assigning (514) the second media item to the second portion of the playback queue includes (520) reassigning the second media item from the first portion of the playback queue to the second portion of the playback queue. As shown in FIGS. 4A-4D, for example, selected media items 400-3 and 400-6 are reassigned from the first queue portion (shown in region 402-1, FIG. 4A) to the second queue portion (shown in region 402-2, FIG. 4D), and consequently have playback priority over (i.e., are to be played before) media items in the first queue portion.

In some implementations, assigning (514) the second media item to the second portion of the playback queue includes (522) adding the second media item to the second portion from the list of search query results. As shown in FIGS. 4E-4I, for example, media item 400-8 is selected from a list of search query results (FIGS. 4G and 4H) and added to the second queue portion (shown in region 402-2, FIG. 4I). Consequently, media item 400-8 has playback priority over (i.e., is to be played before) media items in the first queue portion (corresponding to region 402-1, FIG. 4I).

In some implementations, the second portion of the playback queue is displayed (524) in a second region of the display distinct from the first region. Respective media items of the second portion are displayed in the second region (e.g., in FIG. 4D, media items of the second queue portion are displayed in region 402-2, and media items of the first queue portion are displayed in region 402-1, below region 402-2 of the second queue portion). In some implementations, a division is displayed between the first and second regions (e.g., FIG. 4D, where region 402-1 and region 402-2 are visually separated and respectively labeled).

In some implementations, the respective one or more media items of the second portion include the second media item only, and displaying (524) the second portion in the second region is performed in response to assigning (514) the second media item to the second portion of the playback queue. If no other media items are assigned to the second portion of the playback queue at the time of detecting (508, FIG. 5A) the first user input (for selecting the second media item to be assigned to the second portion), the second portion is displayed in response to (e.g., only after) assignment of the second media item to the second portion of the playback queue. For example, at a time corresponding to FIG. 4A, the playback queue includes only the first portion shown in region 402-1. Once media items 400-3 and 400-6 are selected and assigned to the second portion of the playback queue (FIGS. 4B and 4C), the client device 102-1 displays the second portion (which includes media items 400-3 and 400-6) in region 402-2 in FIG. 4D.

In some implementations, before the second media item is assigned (514) to the second portion, displaying (524) the first portion in the first region includes displaying the second media item in the first region. Furthermore, in these implementations, assigning (514) the second media item to the second portion includes ceasing display of the second media item in the first region, and displaying the second media item in the second region. An example is illustrated in FIGS. 4A and 4D, where media items 400-3 and 400-6 are displayed in region 402-1 (FIG. 4A) before being assigned to the second portion of the playback queue. Once assigned to the second portion, media items 400-3 and 400-6 are displayed in corresponding region 402-2 (FIG. 4D).

In some implementations, after assigning (514) the second media item to the second portion and prior to playing (526, described below) the second media item, a user input is detected indicating selection of an additional media item distinct from the first and second media items. The selected media item is assigned to the second portion of the playback queue. The second media item has a respective position in the second portion that precedes a respective position of the selected media item in the second portion. In other words, in some implementations, media items have corresponding playback positions within the second portion of the playback queue based on a chronological order in which they are assigned to the second portion (i.e., most recently added media items are appended to the second portion of the playback queue, and are to be played last with respect to other prioritized media items of the second portion). For example, media item 400-8 is added from the list of search results (FIG. 4G) to the second queue portion, while media items 400-3 and 400-6 are added to the second queue portion before adding media item 400-8 (FIG. 4B-4D). Accordingly, media item 400-8 is appended to the end of the second queue portion, as shown in region 402-2 in FIG. 4I. In other implementations, media items have corresponding playback positions within the second portion of the playback queue based on a reverse-chronological order in which they are assigned to the second portion (i.e., most recently added media items are added to the beginning of the second portion of the playback queue, and are to be played before playing other prioritized media items of the second portion).

In some implementations, the second media item and an additionally selected media item are media items from the plurality of media items of the first portion of the playback queue. The second media item has a previous position in the first portion that precedes a previous position of the additionally selected media item in the first portion. In these implementations, assigning the additionally selected media item to the second portion of the playback queue is performed concurrently with assigning the second media item to the second portion of the playback queue. An example is illustrated in FIG. 4B, where user input 406-1 corresponds to selection of media item 400-3, and user input 406-2 corresponds to selection of media item 400-6. User input 406-3 (FIG. 4C, "add to up next") indicates that media items 400-3 and 400-6 have indeed been selected for assignment to the second queue portion. In response to user input 406-3, as shown in FIG. 4D, both media item 400-3 and media item 400-6 are concurrently assigned to the second queue portion. Media items 400-3 and 400-6 retain their same relative positions with respect to each other after being assigned to the second queue portion (e.g., media item 400-3 precedes media item 400-6 both in the first queue portion (FIG. 4B) and also in the second queue portion (FIG. 4D)).

After playing the first media item, the second media item is played (526) before playing other media items of the plurality of media items in the first portion. Referring to FIG. 4D, because media item 400-3 is assigned to the second portion having playback priority, media item 400-3 is played after playback of media item 400-1 finishes and before media items 400-2, 400-4, 400-5, and 400-7 of the first portion are to be played. In some implementations, any additional prioritized media items of the second portion of the playback queue are played (528), or at least scheduled to be played, after the first media item and before the other media items in the first portion. Referring to the same example in FIG. 4D, the second portion of the playback queue (shown in region 402-2) includes media item 400-6 in addition to the media item 400-3. Media item 400-6 is to be played before media items 400-2, 400-4, 400-5, and 400-7 of the first portion are to be played.

Referring now to FIG. 5C, in some implementations, a user input indicating selection of a third media item to be played from the second portion of the playback queue is detected (530). The third media item and the second media item are distinct. For example, user input 406-6 (FIG. 4J) is detected on media item 400-6 of the second queue portion displayed in region 402-2. In response to detecting (531) the user input, the client device ceases (532) playback of a current media item and plays (534) the third media item. Furthermore, the third media item is removed (536) from the second portion of the playback queue. Continuing the example above, in response to the user input 406-6 (FIGS. 4J), the client device 102-1 ceases playback of media item 400-1 and commences playback of selected media item 400-6 (FIG. 4K). Furthermore, media item 400-6 is removed from the second queue portion and is no longer displayed in the second region 402-2, as shown in FIG. 4K. Accordingly, the playback order of the second portion (and the overall playback queue) is changed such that media item 400-8 is to be played immediately after media item 400-3 (as opposed to playing media item 400-6 after media item 400-3, and playing media item 400-8 after that). These operations do not modify the first queue portion.

In some implementations, if the third media item is selected from the second portion of the playback queue for playback (530), the second media item is played (526, FIG. 5B) after playing the third media item. Referring to FIGS. 4J and 4K, for example, after media item 400-6 is selected from the second queue portion (FIG. 4J) and after playback of media item 400-6 finishes, media item 400-3 (i.e., the second media item assigned to the second portion, step 514, FIG. 5B) is played.

In some implementations, displaying (524) the second portion in the second region includes displaying the second media item in the second region. After assigning (514) the second media item to the second portion and before playing (526) the second media item, a user input indicating selection for deletion of the second media item from the second portion of the playback queue is detected. In response to detecting the user input, display of the second media item in the second region ceases. In other words, after the second media item is selected for removal from the second portion of the playback queue, the second media item is no longer displayed in the second region for the second portion of the playback queue.

In some implementations, a user input indicating selection of a fourth media item to be played from the first portion of the playback queue (e.g., portion corresponding to a user playlist) is detected (538). The fourth media item is a media item from the plurality of media items of the first portion. For example, user input 406-7 (FIG. 4L) is detected on media item 400-4 of the first queue portion displayed in region 402-1. In response to detecting (538) the user input, the client device ceases (540) playback of a current media item and plays (542) the fourth media item. Furthermore, the fourth media item is removed (544) from the first portion of the playback queue. Continuing the example above, in response to the user input 406-7 (FIGS. 4L), the client device 102-1 ceases playback of media item 400-1 and commences playback of selected media item 400-4 (FIG. 4M). Furthermore, media item 400-4 is removed from the first queue portion and is no longer displayed in region 402-1 in FIG. 4M.

Furthermore, in some implementations, displaying (524) the respective media items of the first portion includes displaying the fourth media item in the first region. In response to detecting (538) the user input indicating selection of the fourth media item, the client device ceases display of the fourth media item in the first region: after the fourth media item is selected for playback from the first portion of the playback queue, the fourth media item is no longer displayed in the first region for the first portion of the playback queue. Continuing the example above, the client device 102-1 detects user input 406-7 (FIG. 4L) on media item 400-4, resulting in the selection of media item 400-4 for playback. Consequently, as shown in FIG. 4M, media item 400-4 is no longer displayed in region 402-1, and is instead displayed in a region of the display corresponding to a media item currently in playback.

In some implementations, in response to detecting (538) the user input, one or more additional media items are removed (546) from the first portion of the playback queue. The one or more additional media items of the first portion precede the fourth media item with respect to the order in which the media items of the first portion are to be played. Continuing the example above (FIGS. 4L and 4M), media item 400-2, which precedes selected media item 400-4, is removed from the first queue portion and no longer displayed in region 402-1 in response to the selection of media item 400-4 for playback. The second queue portion is left unchanged. Accordingly, the playback order of the first queue portion (and the entire playback queue) is changed such that media item 400-5 is to be played immediately after media item 400-8 (as opposed to playing media items 400-2 and 400-4 after media item 400-8, and playing media item 400-5 after that).

In some implementations, if the fourth media item is selected from the first portion of the playback queue for playback (538), the second media item is played (526, FIG. 5B) after playing the fourth media item. Furthermore, the user input corresponding to the selection of the fourth media is detected after the first user input (step 508, FIG. 5A). Referring to FIGS. 4L and 4M, for example, after media item 400-4 is selected from the first queue portion (FIG. 4L) and after playback of media item 400-4 finishes, media item 400-3 (i.e., the second media item assigned to the second portion, step 514) is played. A media item thus may be individually selected from the first queue portion and given higher priority than the second queue portion (e.g., be played immediately).

In some implementations, the client device switches from a first context to a second context, wherein the first context corresponds to playback of media items in the playback queue (e.g., a playback queue including prioritized media items and media items from a user playlist). This switch may result from a user input requesting the switch. While switching from the first context to the second context, the client device queries the user whether to maintain the second portion of the playback queue. In response to detecting a user input for maintaining the second portion, the second portion of the playback queue is maintained upon switching from the first context to the second context, with priority over other media items of the second context. An example is shown in FIGS. 4P and 4Q. Here, a user associated with the client device 102-1 switches from a first context (e.g., playing media items in a playback queue in FIG. 4M, which includes the prioritized media items in region 402-2 and media items from the user playlist in region 402-1) to a second context shown in FIG. 4P (e.g., playing media items from an artist album). As shown in FIG. 4P, while switching contexts, the user is asked whether to maintain the media items assigned to the second portion of the playback queue having playback priority (e.g., media items 400-3, 400-6, and 400-8, FIG. 4M). In response to detecting user input 406-9 (FIG. 4P) indicating an affirmative selection to maintain the second portion, the second portion and corresponding media items 400-3, 400-6, and 400-8 are maintained, as shown in FIG. 4Q. In some implementations, media items corresponding to the second context (e.g., media items 400-12 through 400-16 of artist album "Discovery," FIG. 4Q) are to be played after the maintained second portion of the playback queue. In FIG. 4Q, for example, media items 400-12 through 400-16 of the artist album of the second context are to be played after playing media items 400-6 and 400-8 of the second portion. Furthermore, in this example, media items 400-3, 400-6, and 400-8 of the second portion (e.g., before switching contexts, the next media item to be played, FIG. 4M) commences playback upon switching contexts.

Although some of various drawings illustrate a number of logical stages in a particular order, stages which are not order dependent may be reordered and other stages may be combined or broken out. Furthermore, in some implementations, some stages may be performed in parallel with, in addition to, alternatively to, and/or simultaneously with other stages described with respect to the method 500. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method, comprising:
    at a client device having one or more processors and memory storing instructions for execution by the one or more processors:
        playing a first media item from a playback queue, the playback queue comprising a first portion having a plurality of media items with respective positions that define an order in which the media items are to be played;
        while playing the first media item:
            detecting a first user input indicating selection of a second media item;
            in response to the first user input, assigning the second media item to a second portion of the playback queue, comprising adding the second media item to the second portion from a list of search query results, wherein the second portion has playback priority over the first portion; and
            detecting a second user input indicating selection of a third media item to be played from the first portion of the playback queue, wherein the third media item is a media item from the plurality of media items of the first portion and the first portion includes one or more additional media items that precede the third media item with respect to the order in which the media items of the first portion are to be played;
        in response to the second user input:
            ceasing playback of the first media item;
            playing the third media item;
            removing the third media item from the first portion of the playback queue; and
            removing the one or more additional media items that precede the third media item from the first portion of the playback queue while retaining other media items in the first portion that are after the third media item with respect to the order in which the media items of the first portion are to be played; and
        after playing the third media item, playing the second media item before playing the other media items in the first portion that are after the third media item with respect to the order in which the media items of the first portion are to be played.

2. The method of claim 1, wherein the first portion corresponds to a predefined sequence of media items distinct from the second portion, the predefined sequence of media items including the first media item.

3. The method of claim 1, wherein:
    the second portion of the playback queue comprises one or more prioritized media items in addition to the second media item; and
    the method further comprises, at the client device, playing the one or more prioritized media items after playing the third media item and before playing the other media items in the first portion.

4. The method of claim 1, further comprising, at the client device:
    detecting a third user input indicating selection of a fourth media item to be played from the second portion of the playback queue, wherein the fourth media item and the second media item are distinct; and
    in response to detecting the third user input:
        ceasing playback of a current media item;
        playing the fourth media item; and
        removing the fourth media item from the second portion of the playback queue.

5. The method of claim 1, further comprising, at the client device:
    after assigning the second media item to the second portion and prior to playing the second media item:
        detecting a fourth user input indicating selection of a fifth media item; and
        assigning the fifth media item to the second portion of the playback queue, the second media item having a respective position in the second portion that precedes a respective position of the fifth media item in the second portion.

6. The method of claim 1, further comprising, at the client device:
 displaying the first portion of the playback queue in a first region of a display of the client device, including displaying respective media items of the first portion in the first region; and
 displaying the second portion of the playback queue in a second region of the display distinct from the first region, including displaying respective media items of the second portion in the second region.

7. The method of claim 6, further comprising, at the client device, displaying a division between the first and second regions.

8. The method of claim 6, wherein:
 the respective one or more media items of the second portion include the second media item only; and
 displaying the second portion in the second region is performed in response to assigning the second media item to the second portion of the playback queue.

9. The method of claim 6, wherein displaying the respective media items of the first portion in the first region comprises displaying a sixth media item in the first region, the method further comprising, at the client device:
 detecting a fifth user input indicating selection of the sixth media item from the first portion of the playback queue to be played; and
 in response to detecting the fifth user input, playing the sixth media item and ceasing display of the sixth media item in the first region.

10. The method of claim 9, wherein displaying the first portion in the first region comprises displaying one or more media items in the first region, wherein the one or more media items precede the sixth media item with respect to the order in which the media items of the first portion are to be played,
 the method further comprising, at the client device, in response to detecting the fifth user input, removing the one or more media items from the first portion and ceasing display of the one or more media items in the first region while leaving the content of the second portion unchanged.

11. The method of claim 1, further comprising, at the client device:
 switching from a first context to a second context, wherein the first context corresponds to playback of media items in the playback queue;
 while switching from the first context to the second context, querying a user associated with the client device whether to maintain the second portion of the playback queue; and
 in accordance with detecting a user input for maintaining the second portion, maintaining the second portion of the playback queue upon switching from the first context to the second context.

12. A client device, comprising:
 one or more processors; and
 memory storing one or more programs for execution by the one or more processors, the one or more programs including instructions for:
  playing a first media item from a playback queue, the playback queue comprising a first portion having a plurality of media items with respective positions that define an order in which the media items are to be played;
  while playing the first media item:
   detecting a first user input indicating selection of a second media item;
   in response to the first user input, assigning the second media item to a second portion of the playback queue, comprising adding the second media item to the second portion from a list of search query results, wherein the second portion has playback priority over the first portion; and
   detecting a second user input indicating selection of a third media item to be played from the first portion of the playback queue, wherein the third media item is a media item from the plurality of media items of the first portion and the first portion includes one or more additional media items that precede the third media item with respect to the order in which the media items of the first portion are to be played;
  in response to the second user input:
   ceasing playback of the first media item;
   playing the third media item;
   removing the third media item from the first portion of the playback queue; and
   removing the one or more additional media items that precede the third media item from the first portion of the playback queue while retaining other media items in the first portion that are after the third media item with respect to the order in which the media items of the first portion are to be played; and
  after playing the third media item, playing the second media item before playing the other media items in the first portion that are after the third media item with respect to the order in which the media items of the first portion are to be played.

13. A non-transitory computer-readable storage medium storing one or more programs for execution by one or more processors of a client device, the one or more programs including instructions for:
 playing a first media item from a playback queue, the playback queue comprising a first portion having a plurality of media items with respective positions that define an order in which the media items are to be played;
 while playing the first media item:
  detecting a first user input indicating selection of a second media item;
  in response to the first user input, assigning the second media item to a second portion of the playback queue, comprising adding the second media item to the second portion from a list of search query results, wherein the second portion has playback priority over the first portion; and
  detecting a second user input indicating selection of a third media item to be played from the first portion of the playback queue, wherein the third media item is a media item from the plurality of media items of the first portion and the first portion includes one or more additional media items that precede the third media item with respect to the order in which the media items of the first portion are to be played;
 in response to the second user input:
  ceasing playback of the first media item;
  playing the third media item;
  removing the third media item from the first portion of the playback queue; and
  removing the one or more additional media items that precede the third media item from the first portion of the playback queue while retaining other media items in the first portion that are after the third media item with respect to the order in which the media items of the first portion are to be played; and after playing the third media item, playing the second media item before playing the other media items in the first portion that are after the third media item with respect to the order in which the media items of the first portion are to be played.

\* \* \* \* \*